United States Patent [19]
Racine

[11] 3,868,132
[45] Feb. 25, 1975

[54] QUICK MOUNT FITTING

[76] Inventor: William H. Racine, P.O. Box 378, Lakeside, Mich. 49116

[22] Filed: June 21, 1973

[21] Appl. No.: 371,977

Related U.S. Application Data

[63] Continuation-in-part of Ser. No. 229,754, Feb. 28, 1972, abandoned, which is a continuation-in-part of Ser. No. 141,480, May 10, 1971, Pat. No. 3,738,688.

[52] U.S. Cl. .................. 285/312, 285/323, 285/346
[51] Int. Cl. .............................................. F16l 37/18
[58] Field of Search ............. 285/312, 338, 16, 311, 285/310, 309, 105, 348, 343, 323, 157, 341, 232, 102, 101, 100, 346; 74/569; 308/DIG. 7

[56] References Cited
UNITED STATES PATENTS

| | | | |
|---|---|---|---|
| 1,340,785 | 5/1920 | McMullin | 285/312 X |
| 1,767,677 | 6/1930 | Huff | 285/157 X |
| 1,848,538 | 3/1932 | Mudd | 285/101 |
| 2,056,249 | 10/1936 | Bystricky | 285/102 |
| 2,885,248 | 5/1959 | White | 308/DIG. 7 |
| 3,572,776 | 3/1971 | Herd | 285/315 X |

FOREIGN PATENTS OR APPLICATIONS

| | | | |
|---|---|---|---|
| 345,746 | 4/1931 | Great Britain | 285/346 |

*Primary Examiner*—Thomas F. Callaghan

[57] ABSTRACT

A fitting is be quickly mounted to smooth wall tubes, said fitting having an entry for the tube end, an annular seal within said body, and a ram element within said body which is translated to sealing and release positions by a quick operating actuating means. Means are provided to reduce wear between the ram element and the actuating means. The fitting may be provided as a dead head or may be coupled to a second conduit for conveying fluids therethrough; and the fitting may be adapted for high pressure fluid conveyance by including within the body a split collet member cooperating with said seal to enhance sealing action under high pressure.

4 Claims, 10 Drawing Figures

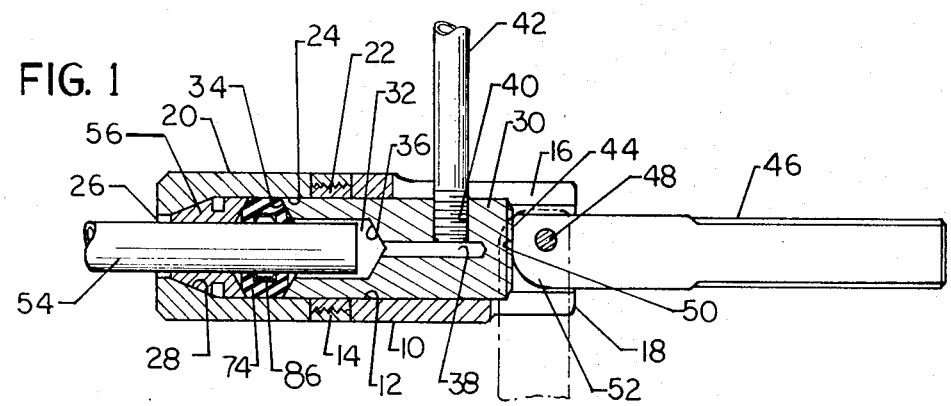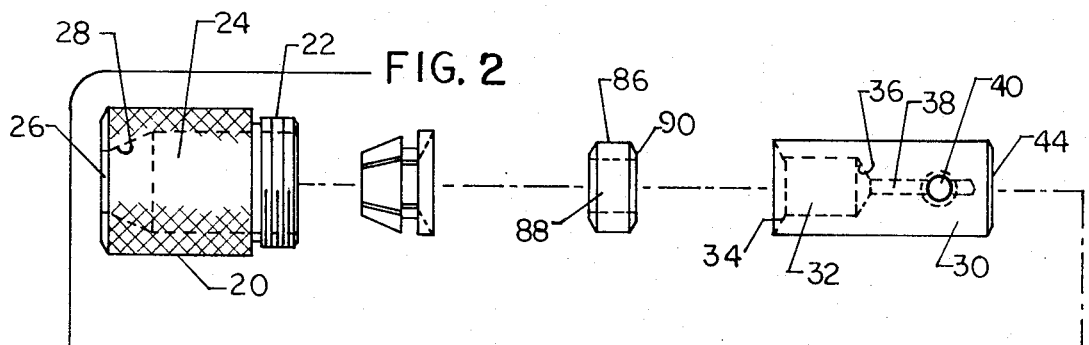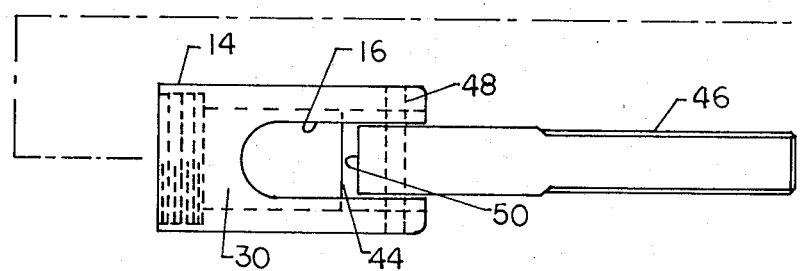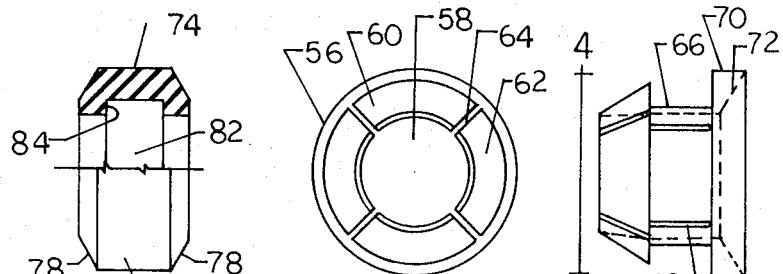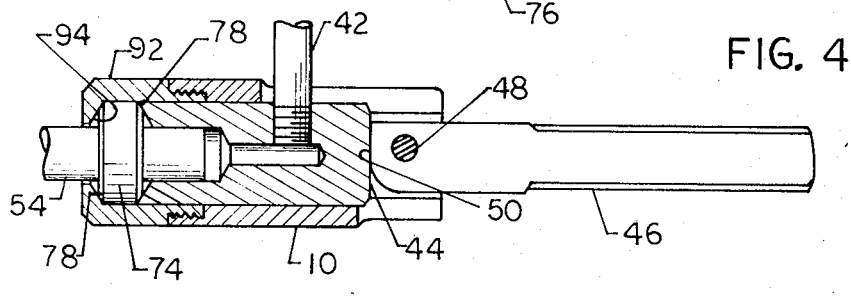

QUICK MOUNT FITTING

This application is a continuation-in-part of copending application Ser. No. 229,754, filed Feb. 28, 1972 and now abandoned which was a continuation-in-part of copending application Ser. No. 141,480, filed May 10, 1971. now U.S. Pat. No. 3,738,688.

This invention relates to a fitting which is quickly mounted to a smooth wall tube end to provide efficient sealings and secure mounting for either low pressure or high pressure fluids conveyed through said tube end. The invention particularly relates to a tube fitting of this type wherein quick operating means are provided with said fitting to provide release of the tube end in one position and sealing action in a second position, both positions being quickly assumed.

Various types of fittings for smooth wall tubes have been used for long periods of time in the art. Such fittings in general provide threaded coupling elements housing an annular seal which is distended into sealing action against the tube upon tightening of the threaded coupling element. Such seals are often used in combination with ferrule or collet members to provide biting or clamping action on the thin wall tube. Such fittings have assorted advantages and utilities in this art, but all require secure tightening or turning of the screw coupling element. This understandably requires time both to complete mounting and to provide dismounting when necessary to change fittings, to repair, or the like.

It would be highly desirable in many applications to have a fitting which could be quickly and easily mounted and dismounted. For example, it would be desirable to have such a fitting for low and high pressure charging and vacuum applications on coils, compressors and other components in cooling apparatus. It would additionally be desirable to have a versatile fitting which can meet such easy on and easy off requirements. In particular, it would be desirable to adapt such a fitting to both low and high pressure fluid conveyance, to provide such a fitting for transmitting fluids to conduits coupled thereto, as well as to provide dead head fittings, as well as still other features.

It is accordingly one important object of the present invention to provide a new fitting which may be quickly mounted in an improved manner by actuating a quick operating means from a first release position to a second seal and lock position.

Still another important object of the present invention is to provide a fitting which can be adapted for both high and low pressure conveying fluids while still obtaining the advantages of quick mounting and dismounting of the fitting.

Still yet another important object of the present invention is to provide an improved fitting of the type described which can be adapted for transmitting fluids therethrough, or which can operate as a dead head fitting. Still yet another important object is to utilize a cam operating element as part of a unitary fitting assembly for quickly torquing to a seal and lock position and quickly torquing to a release position.

A still yet another important object is to provide effective means for resisting wear in operating the improved fitting, particularly in aluminum to aluminum bearing surfaces.

Another important object is to provide an improved fitting of the type described which can utilize advantageous complementary tapering surfaces of seals, collets, ferrules, or the like, and other cooperating elements of the fitting to enhance the sealing action in quick mounting of the fitting.

These an still other objects which will occur from time to time to practitioners are now attained by the invention of the following disclosure, including drawings wherein:

FIG. 1 is a partly sectional view of the fitting in side elevation;

FIG. 2 is an elevational exploded view, on an enlarged scale, of a split collet component which may be utilized in the improved fitting;

FIG. 3 is a side elevational view, on an enlarged scale, of a split collet component which may be utilized in the improved fitting;

FIG. 4 is a front elevational view of the collet along line 4—4 of FIG. 3;

FIG. 5 is a side elevational view, partly in section and on an enlarged scale, of an elastomeric seal used with the improved fitting;

FIG. 6 is a side elevational view, partly in section of an embodiment of the fitting useful for mounting to tubes conveying low pressure fluids;

The use of the same numerals in the various views of the drawings will indicate a reference to like structures, elements or other features, as the case may be.

Figure 7:
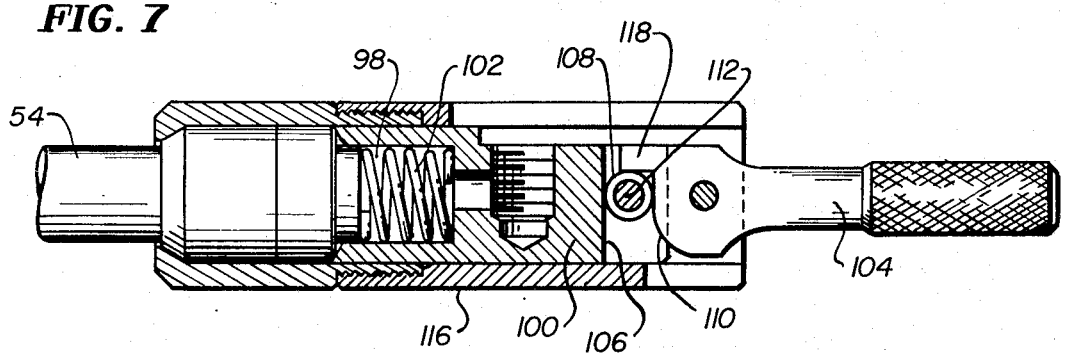
FIG. 7 is a side elevational view, partly in section, illustrating means to resist wear between the actuating means and the ram element.

Referring now to the drawings, the body or housing is shown to consist of two coupling parts. One is body part 10 which has body passageway 12 and a threaded end of reduced thickness 14. A coupling slot 16 is in the body part diametrically opposed to a lever slot 18.

A head part 20 is shown with a threaded collar 22, and such head part has a head passageway 24. A threaded lap joint is formed by engagement of threaded elements 14 and 22.

The head part of the body has a reduced opening shown as circular with uniform diameter. An inside tapered area is formed by taper 28 of the wall of the head part.

The assembled head and body parts define a common tubular body passage, and a ram or insert 30 is translatably positionable within this body passage. A ram socket 32 in the ram opens into the body passage, such opening defined by tapered annular edge 34 of the ram. The socket 32 has a conical bottom 36. A reduced fluid passage 38 extends from conical bottom 36 of the socket into the ram element. The threaded bore 14 is shown positioned normally to fluid passage 38, and a coupling conduit 42 is shown mounted in said threaded bore.

The ram element is shown with a force receiving or torquing face or means 44. Quick operating means are positioned to exert a force against face 44, and such means is preferably the illustrated elongated cam element mounted to the body to form a unitary assembly. The cam element has a handle portion 46, and the opposite end is joined to the body by pivot or pin 48. The pin is asymmetrically positioned relative to the long axis of the cam element so that a low cam surface 50 adjoins the force receiving face when the cam element is in release position as shown in solid line in the view of FIG. 1.

The cam element has a high cam surface 52 which induces movement of the ram element towards the body entry 26 when such cam element is moved substantially 90° to the position indicated in phantom in the view of FIG. 1. Movement of the cam element from the first or release position to the second or sealing position is a torquing movement which translates movement of the ram element toward the entry of the body of the fitting.

The end of a smooth walled tube 54 is shown inserted in the fitting. The smooth wall tube passes through a split collet member 56, that is, through collet passage 58 thereof.

The collet is seen to have a truncated cone end 60 consisting of arcuate cone section 62 separated by cone slits 64. A continuous body wall 66 has a plurality of body wall slits 68 which are colinear with the cone slits 64. The other end of the collet has an end flange 70 with an inside circular taper 72.

The embodiment shown in FIG. 1 shows the smooth wall tube 54 with the mounted collet member 56, and with a mounted annular, elastomeric seal 74. The seal has a continuous wall 76 and opposite tapered edges 78. The continuous wall defines a seal passage 82 which is also shown with a recessed slot 84 in which a split ferrule 86 may be positioned. Such split ferrule is shown to have lapping L ends 88 which allow limited reduction of the diameter of the ferrule. The ferrule also has a biting edge 90.

In operation, the fluid wall tube is passed through entry 26, collet passage 58 and seal passage 82, and the end of the tube is bottomed in ram socket 32 short of conical bottom 36. Quick operation of handle 46 from release to sealing position results in low and high cam surfaces acting against torque receiving face 44 to thereby translate said ram element to urge collet 56 into the tapered area to adjoin the body opening, and to compress and distend seal 74 into sealing action against the wall of the tube 54. The various tapers are preferably complementary relative to one another to enhance the sealing action, as with tapered cone 60 and inside taper 28; inside taper 72 of end flange 70 and one of tapered edges 78; and tapered edge or face 34 of the ram and the opposite tapered edge of the seal.

The combination of a collet and elastomeric seal, with ferrule, is preferred in a fitting for conveying high pressure fluids. The improved fitting may also be adapted for conveying lower pressure fluids by providing an embodiment such as shown in the view of FIG. 6. Here, a head part 92 is provided with an inside taper 94 which forms a larger internal angle with the wall of tube 54 than does the inside taper 28 of head 20 in the view of FIG. 1. This allows seal 74 to be positioned closer to the open end or entry of the body. Inside taper 94 preferably complements taper 78 of the seal. The additional sealing actions of the collet and ferrule may be dispensed with in many low pressure operations.

The embodiments particularly illustrated herein show the fitting adapted for conveying fluids, high or low pressure, to a conduit coupled to the fitting. A conduit such as 42 can be used as a charging tube, for example, to introduce pressurized air to test for leaks or to charge with a refrigerant such as the Freons. It should be understood that the ram element or insert may be provided without such a coupling conduit, and without threaded bore 40. In such a form, the ram closes off the body passage so that the fitting operates as a dead head fitting, useful for refrigeration coils, compression coils, or still other fluid conveying lines.

It is desirable to utilize aluminum material for the fittings because of its economy, lightness and general serviceability. A detraction in using such materials is the aluminum to aluminum abrasion or wear which occurs at an undesirable stage upon repeated mounting and demounting of the fitting. The views of FIGS. 8–10 illustrate means to resist such wear between the force receiving face of the ram element and the force transmitting face of the handle or actuating means.

Figure 8:
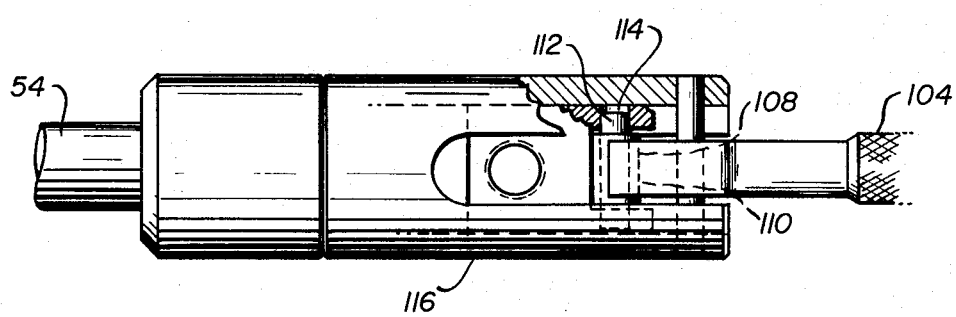
FIG. 8 is a top elevational view of the fitting shown in FIG. 7, with portions removed for purposes of clarity.

In the views of FIGS. 7 and 8 there is seen a fitting wherein the ram socket 98 of the ram element 100 has a spring 102 which is urged against the end of the smooth wall conduit 54 upon mounting the fitting. The spring 102 takes up pressure from the end of the smooth wall tube which is inserted into the fitting. The smooth wall tube is bottomed on the spring after insertion, rather than in the ram socket. Bottoming in the ram socket would tend to move the tube past the holding action of the split collet clamp, and out of the fitting. Actuating the ram by turning the cam lever downwardly clamps the split collet onto the tube, and results in compressing the spring, one final turn whereof is bottomed in the ram socket, and the opposite final turn whereof is bottomed against the end of the tube. Such an arrangement results in positive positioning of the smooth wall tube in the fitting without pushing the tube out of the fitting from excessive travel of the ram after clamping the split collet to the tube. The tube is positively positioned in the fitting when it is inserted and bottoms against the spring, such tube otherwise bottoming in the ram socket. The spring, so to speak, takes up or absorbs the back force which would otherwise tend to push the tube out of the fitting.

Additional means are provided in this embodiment for reducing wear, particularly, between the force exerting means or handle 104 and the force receiving or torquing face 106 of the ram element. A hardened steel pin or roller 108 is interposed between torquing face 105 of the ram element and force exerting face 110 of the handle 104. The roller at 108 is shown with opposite reduced diameter roller ends 112 journaled in apertures 114 in ram element. The cam surfaces which make up the force actuating face 110 are terminated by flange stop 118 which is shown integrally formed with handle member 104. The flange stop 118 contacts roller 108 when the handle 104 is in full unlocked position for mounting or demounting the fitting. The roller 108 rotates to rollingly engage force exerting face 110 and torquing face 105.

Figure 9:
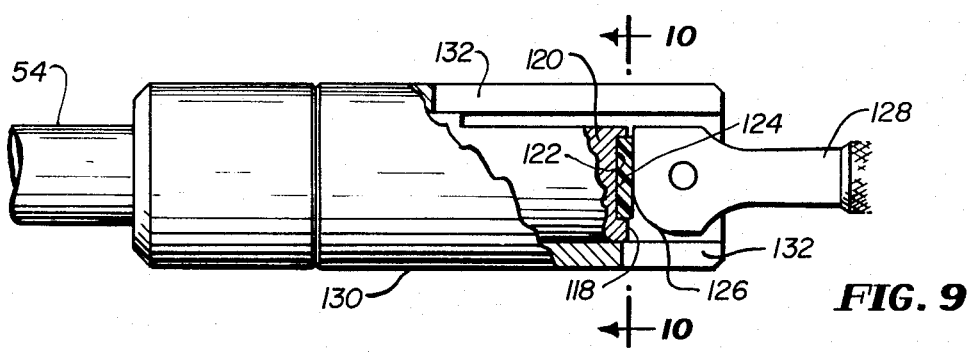
FIG. 9 is a side elevational view of an alternative embodiment with portions removed for purposes of clarity; illustrating other means for resisting wear between the actuating means and the ram element.
Figure 10:
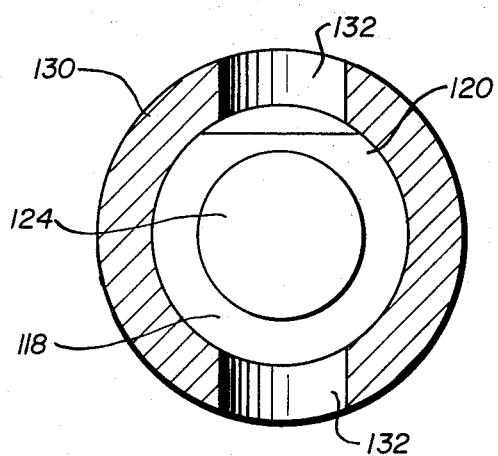
FIG. 10 is an end elevational view of the fitting, on an enlarged scale, and with the actuating means removed for purposes of clarity.

The embodiment shown in FIGS. 9 and 10 may include a spring such as 102 in the ram socket space. In any event, the force receiving face 118 of the ram element 120 has a socket or cavity 122 in which is placed a hard abrasion resistant plastic button 124. The disc shaped button 124 preferably extends out of cavity 122 a short distance so that it can contact all of the force exerting face 126 of handle member 128. By way of example, the circular cavity 122 would have a diameter closely dimensioned to allow the circular disc 124 to be interference fitted therein with or without a bonding material. The depth of the cavity may be at the most one-half the thickness of the plastic disc or button 124. Plastic materials which are used to advantage for such plastic buttons include nylon, hard urethane elastomers, or the like. The end view of FIG. 10 shows the position or relationship of the tough plastic button 124, having a lower coefficient of friction, in relation to the force receiving face 118 of the ram element 120; and in relation to the tubular body wall 130 having opposed coupling slots 132. It will be seen that the wear resistant means between the force receiving and force exerting faces result in reduced frictional force, either by a rolling surface or a reduced coefficient of friction of the material.

The claims of the invention are now presented, and the terms thereof should be further considered in view of the preceeding specification and drawings.

What is claimed is:

1. A fitting for outside diameter sealing of a smooth walled tube end including:
   a body, a passage in such body,
   an entry for said tube end in such body, an inwardly continuous tapered area at said body entry,
   an annular elastomeric seal within said body, said seal having a dimension greater than said body entry,
   a ram element within the body, the end of said ram element having a torquing face, a passageway in said ram element communicating with said body passage, a socket in said ram element having a bottom wall,
   a split collet element positioned between said seal and said body entry,
   an elongated cam element pivotally mounted to said body and movable against the ram element within said body against said seal to distend same in sealing action against said tube end and to force the split collet into engagement with said body entry and said tube end, said cam element having a cam surface,
   a spring in said ram socket, one end of said spring bearing against said bottom wall and the other end of said spring bearing against the end of the tube inserted into the fitting, thereby preventing the tube from bottoming in the ram socket whereby movement of the ram element compresses the spring but does not push the tube out of the fitting and
   a wear resistant element interposed between the cam surface of the elongated cam element and the torquing face of the ram element, said wear resistant element providing reduced frictional force between the torquing face and the cam surface.

2. A fitting which includes the features of claim 1 above wherein said elongated cam element has a handle portion, said elongated cam element being pivoted to said body at an end opposite said handle, said pivoted end having a cam surface in which a lower cam surface adjoins a torquing face of the ram element in release position, and wherein a high cam surface adjoins said torquing face in sealing position when the handle is moved substantially 90° to said second position.

3. A fitting which includes the features of claim 1 above wherein said wear resistant element is a hard, tough plastic body projecting beyond the torquing face of the ram element.

4. A fitting which includes the features of claim 1 above wherein said wear resistant element is a roller mounted in rotatable engagement with the cam surface of the elongated cam element and the torquing face of the ram element.

* * * * *